(12) United States Patent
Sullivan et al.

(10) Patent No.: US 11,887,320 B1
(45) Date of Patent: Jan. 30, 2024

(54) SYSTEM AND METHOD FOR PRODUCING CUSTOM FITTED FACE MASKS AND APPLICATIONS THEREOF

(71) Applicant: Oceanit Laboratories, Inc., Honolulu, HI (US)

(72) Inventors: Christopher Sullivan, Honolulu, HI (US); Matthew Williams, Honolulu, HI (US); Matthew Sullivan, Honolulu, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 295 days.

(21) Appl. No.: 17/214,545

(22) Filed: Mar. 26, 2021

Related U.S. Application Data

(60) Provisional application No. 63/000,437, filed on Mar. 26, 2020.

(51) Int. Cl.
| | |
|---|---|
| *G06T 7/521* | (2017.01) |
| *G01B 11/25* | (2006.01) |
| *G06F 30/23* | (2020.01) |
| *G06T 3/00* | (2006.01) |
| *G06T 19/20* | (2011.01) |
| *G06V 40/16* | (2022.01) |

(Continued)

(52) U.S. Cl.
CPC .......... *G06T 7/521* (2017.01); *G01B 11/2518* (2013.01); *G06F 30/23* (2020.01); *G06T 3/0075* (2013.01); *G06T 3/0093* (2013.01); *G06T 19/20* (2013.01); *G06V 40/171* (2022.01); *G06V 40/176* (2022.01); *G06F 2113/10* (2020.01); *G06F 2113/12* (2020.01); *G06T 2207/10028* (2013.01); *G06T 2207/30201* (2013.01); *G06T 2219/2004* (2013.01)

(58) Field of Classification Search
CPC ..... G06T 7/521; G06T 3/0075; G06T 3/0093; G06T 19/20; G06T 2207/10028; G06T 2207/30201; G06T 2219/2004; G01B 11/2518; G06F 30/23; G06F 2113/10; G06F 2113/12; G06V 40/171; G06V 40/176
USPC .................................................. 382/103, 154
See application file for complete search history.

(56) References Cited

U.S. PATENT DOCUMENTS

| | | | |
|---|---|---|---|
| 10,860,838 B1 * | 12/2020 | Elahie | A63F 13/655 |
| 2006/0023228 A1 * | 2/2006 | Geng | A61B 5/411 |
| | | | 356/601 |

(Continued)

OTHER PUBLICATIONS

Patel et al., "3D morphable face models revisited," 2009 IEEE Conference on Computer Vision and Pattern Recognition (2009).

(Continued)

*Primary Examiner* — Kathleen Y Dulaney
(74) *Attorney, Agent, or Firm* — Fresh IP PLC; Clifford D. Hyra; Aubrey Y. Chen

(57) ABSTRACT

The present invention is generally directed to systems and methods for preparing and producing a custom-fitted face mask, including, as non-limiting examples, a CPAP nasal mask and a CPAP full face mask. At least one embodiment of the invention utilizes infrared (IR) lasers, such as, for example, those found on smartphone cameras, in order to generate a 3D point cloud model of an individual's face. This point cloud model is then used to produce a custom face mask cushion, which is used to customize a generic face mask to conform to the user's specific facial geometry.

14 Claims, 7 Drawing Sheets

(51) Int. Cl.
*G06F 113/12* (2020.01)
*G06F 113/10* (2020.01)

(56) References Cited

U.S. PATENT DOCUMENTS

| | | | |
|---|---|---|---|
| 2015/0146027 A1* | 5/2015 | Ramachandran | G06T 7/50 348/211.3 |
| 2018/0369528 A1* | 12/2018 | Margaria | A61B 5/1077 |
| 2018/0369529 A1* | 12/2018 | Grashow | B29C 64/386 |
| 2019/0147676 A1* | 5/2019 | Madzhunkov | G06F 21/32 340/5.2 |
| 2020/0250403 A1* | 8/2020 | Xiao | G06V 40/168 |
| 2021/0082136 A1* | 3/2021 | Nikitidis | G06V 40/172 |
| 2021/0186319 A1* | 6/2021 | Straub | A61B 3/0083 |
| 2021/0209839 A1* | 7/2021 | Hu | G06T 17/00 |
| 2021/0322702 A1* | 10/2021 | Davis | B33Y 80/00 |

OTHER PUBLICATIONS

Clark et al, "The CN2 induction algorithm," Machine Learning 3.4: 261-83 (1989).

* cited by examiner

SYSTEM AND METHOD FOR PRODUCING CUSTOM FITTED FACE MASKS AND APPLICATIONS THEREOF

CROSS-REFERENCE TO RELATED APPLICATIONS

This application claims the benefit of U.S. Provisional Application No. 63/000,437, filed Mar. 26, 2020, which is hereby incorporated by reference in its entirety.

The invention described herein was made with U.S. government ("Government") support under Contract No. N683335-19-C-0010, awarded by the U.S. Department of the Navy. As a result, the Government has certain rights in this invention.

FIELD OF THE INVENTION

The application relates generally to systems and methods for preparing and producing custom-fitted face masks, including, but not limited to, medical masks, nasal masks, continuous positive airway pressure (CPAP) masks, and the like.

BACKGROUND

Wearable masks that cover some or all of an individual's face are widely used in various applications for a large number of purposes, including, for instance, to act as a barrier against physical particles, dust, and microorganisms, to promote general health and safety, to prevent the spread of airborne diseases, to deliver medications or medically-necessary nutrients, and to deliver air and/or oxygen. In particular, one common use of a face mask is to treat sleep apnea, which affects millions of individuals worldwide. In the U.S. alone, 20-30% of men and 10-15% of women suffer from obstructive sleep apnea (OSA), a condition in which the upper airway collapses during sleep and significantly limits or obstructs air entry into the lungs.

A common treatment of sleep apnea is a continuous positive airway pressure (CPAP) mask, which works by applying positive air pressure to the upper airway, which consists of the nasal passages, mouth, nasopharynx, oropharynx, and hypopharynx. CPAP pressure opens the upper airway, allowing the sleeper to breathe easily without intermittent obstruction and interruption of airflow into the lungs. CPAP pressure is delivered via a mask applied over the nose (nasal mask) or over the nose and mouth (full face mask) with air pressure tubing running from the mask to a CPAP machine. A good mask seal is desirable as high leak rates from air escaping around the sides of the mask are uncomfortable and may disrupt sleep. High leak rates may also cause CPAP treatment to be ineffective. Additionally, some sleepers find using a mask at night uncomfortable and so have difficulty sleeping with one. Further, some sleepers will easily fall asleep using a CPAP mask only to discover that sometime during the night it has come off or that they have removed it surreptitiously. These problems clearly make CPAP therapy less effective than it otherwise might be. A process whereby a more comfortable and effective mask with lower leak rates could be easily manufactured at a low cost would be a great advancement in the treatment of OSA and other forms of sleep disordered breathing. Fabricating a CPAP mask that conforms to the shape of a sleeper's face decreases leak rates, improves comfort, and allows for less respiratory dead space, and requires less material for manufacture of the mask itself.

Given the foregoing, there exists a significant need for new technologies capable of producing custom-fitted face masks, including, for example, CPAP masks, that allow for increased comfort, usability, and efficacy.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In general, the present invention is directed to systems and methods for preparing and producing custom-fitted face masks, including, as a non-limiting example, CPAP masks. At least one embodiment of the invention utilizes a smartphone or other mobile device to project infrared (IR) wavelength laser points, for which measured changes across a period of time can be used to generate an accurate 3D point cloud that models an individual's face. This 3D point cloud can then be used generate a custom face mask cushion to augment existing generic face masks and make them personalized to fit the individual's specific face geometry at low cost.

Given the increased prevalence of smartphones and other mobile devices over the past decade, one of skill in the art will appreciate the possibility of leveraging the IR cameras and high-speed processing of such phones and devices in order to accurately map, measure, and generate a detailed 3D model of a person's face, eyes, or other portions of their body. In particular, and with reference to at least one embodiment of the present invention, many smartphone cameras now employ low-cost, high-resolution IR lasers and cameras that can be used to scan and identify a person's face. Such IR cameras use wavelengths of light that are not visible to the human eye, but can nonetheless be used to map one or more portions of a person's body, including, for example, their face.

Indeed, many smartphone cameras project an intense infrared light that is used to illuminate the user's face. While the user's face is illuminated, a matrix of infrared light-emitting-diode (LED) lasers is projected over that same face. These LEDs use a wavelength of light that contrasts with the light used for illumination, and thousands of individual points of light cover the face. As the person's face moves, the points of light reflect the changes. One of skill in the art will appreciate that smartphones are capable of measuring the changes in light points while an object (such as a user's face) is in motion by using a method known as depth image acquisition using modulated pattern projection. Data collected by the smartphone, via the points of light, show shape, edge detection, and depth, which can be then used to generate a 3D model.

Due to the large amount of collected data and the requirement for sub-second response times, calculations are done locally on the smartphone or mobile device using subsystems and processor(s) that analyze the data in real time as it is being collected. Previously, a reference image (such as a dime) was required in order to determine the real versus relative size of the object being scanned. Due to the new computing data and methods described above, accurately determining the real size of an object is now done without the need for a reference image, further enabling the ease of using such data and methods for mapping and modeling a person's face.

It should be appreciated that these two new enabling technologies, i.e., (1) highly accurate IR lasers and cameras, and (2) significantly faster on-device processing power compared to previous generations of smartphones, mobile devices, and other handheld devices, are found on many of today's smartphones and have enabled the construction of detailed 3D maps of a person's face and/or other parts of their body relatively simply and for low cost. Such maps can then be used, as described herein, to generate custom face mask cushions that can be used to augment existing generic face masks and personalize such generic face masks to fit a user's specific facial geometry.

These and further and other objects and features of the invention are apparent in the disclosure, which includes the above and ongoing written specification, as well as the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art.

DETAILED DESCRIPTION

Figure 1:
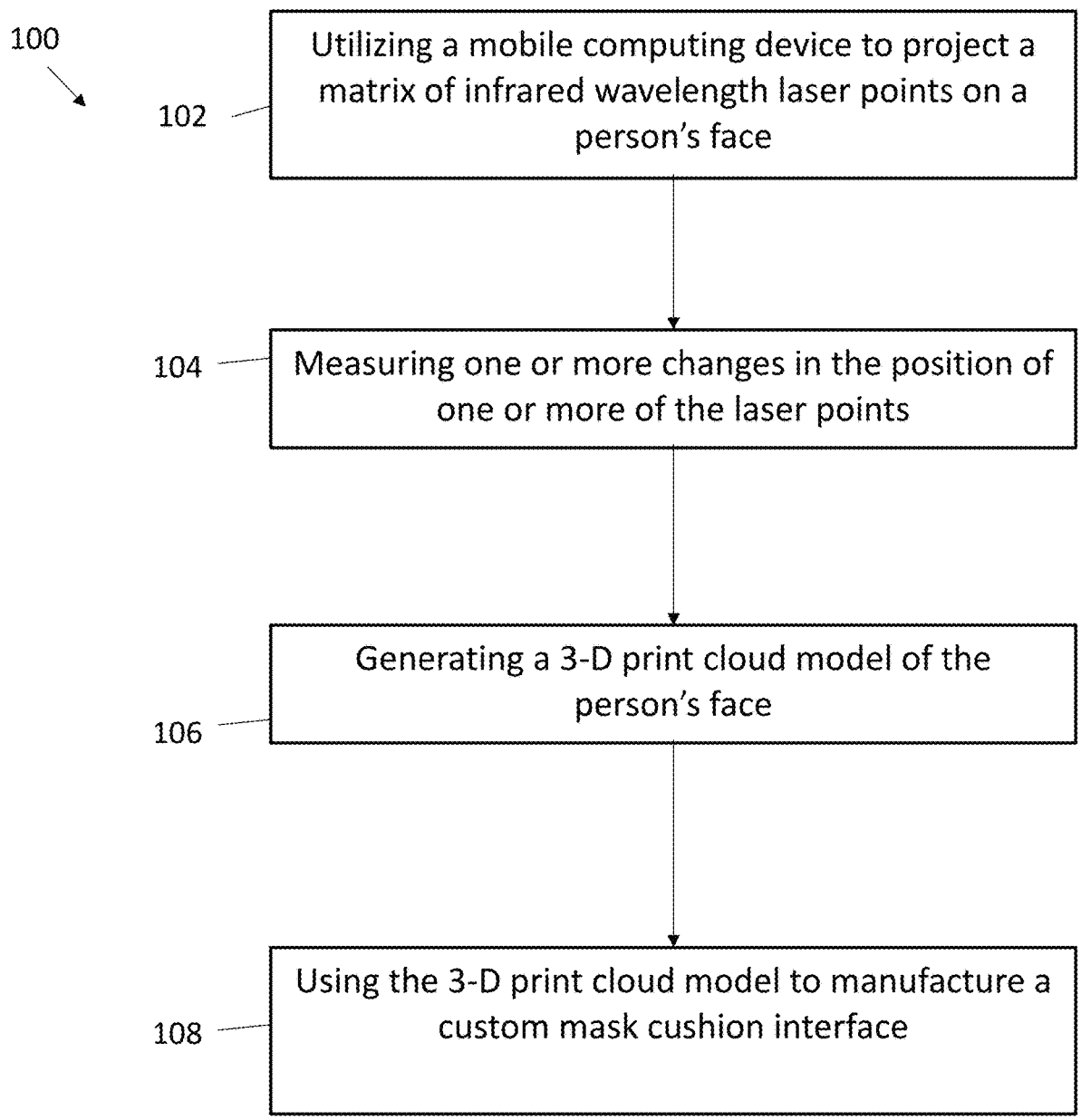
FIG. 1 illustrates a flow diagram of an exemplary method for producing a custom-fitted face mask, according to an embodiment of the present invention.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

Generally, the present invention is directed towards systems and methods for preparing and producing a custom-fitted face mask, including, as non-limiting examples, a CPAP nasal mask and a CPAP full face mask. At least one embodiment of the invention utilizes IR lasers, such as, for example, those found on smartphone cameras, in order to generate a 3D point cloud of an individual's face. This point cloud is then used to produce a custom face mask cushion, which is used to customize a generic face mask to conform to the user's specific facial geometry.

FIG. 1 illustrates a flow diagram of an exemplary method 100 for preparing and producing a custom-fitted face mask, according to an embodiment of the present invention. The method 100 first comprises a step 102 of utilizing a mobile computing device, such as, for instance, a smartphone, to project a matrix of infrared wavelength laser points at a person's face. Each point in the matrix of infrared laser points thus has an initial position on the person's face. This matrix may be generated by, for example, one or more cameras of the mobile computing device.

The usage of mobile computing devices to project a matrix of infrared laser points is an improvement over the current state of the art. Current methods of modeling an individual's face and/or producing custom-fitted face masks do not utilize the highly accurate infrared lasers on mobile computing devices, nor such devices' processing power.

The method further comprises a step 104 of measuring one or more changes in the initial position of one or more of the laser points as the person turns their head, thereby producing one or more measurement change values. This is a known technique and can be carried out for example using a user's smartphone.

The method additionally comprises a step 106 of generating a 3D point cloud model of the person's face using the one or more measurement change values. Such a model can be generated using, for example, known computer algorithms or computer software.

The method additionally comprises a step 108 of using the 3D point cloud model to manufacture a custom mask cushion interface. Such an interface is a physical integration of a generic mask with a personalized, fitted face cushion or buffer. It should be appreciated that the generic mask may be one or more face masks that are purchased off-the-shelf and/or are otherwise generic and not fitted for any particular individual. The fitted face cushion can therefore be considered an "adapter" or means of adaptation for the generic mask, such that the generic mask, when combined with the fitted face cushion, is personalized to fit a given individual's face. It should also be appreciated that any given custom mask cushion interface may be further tested and adapted in order to be more closely conforming to the individual's face. The results of such further testing and adaptation may then be input into the method in order to enhance future fit accuracy.

The step 108 may itself comprise various intermediate steps, including, for instance, (1) generating a uniform coordinate system for referencing equivalent facial points on different facial scans, (2) designing oxygen masks for a given 3D scan, which is used as a surrogate when a hand-designed mask is not available, (3) automatically "fitting" an oxygen mask onto a scan and quantifying the amount of mismatch between the mask and the face represented in the scan, and (4) clustering the 3D facial scans to minimize the amount of mismatch given a fixed number of masks and using that information to generate a set of exemplar facial scans.

First, a uniform coordinate system must be generated so that reference locations on each facial scan can be identified properly. This is important since different faces, and therefore different facial scans, have different facial structures. Additionally, facial masks should ideally fit slightly below the bridge of the nose; hence, it is important to know where the bridge of the nose is in any given facial scan. To generate such a uniform coordinate system, a fixed face template, shown below in FIG. 1, is warped to each 3D facial scan. The vertices and edges of the template then form a universal coordinate system that can be used to reference equivalent locations on each of the scans.

Figure 2:
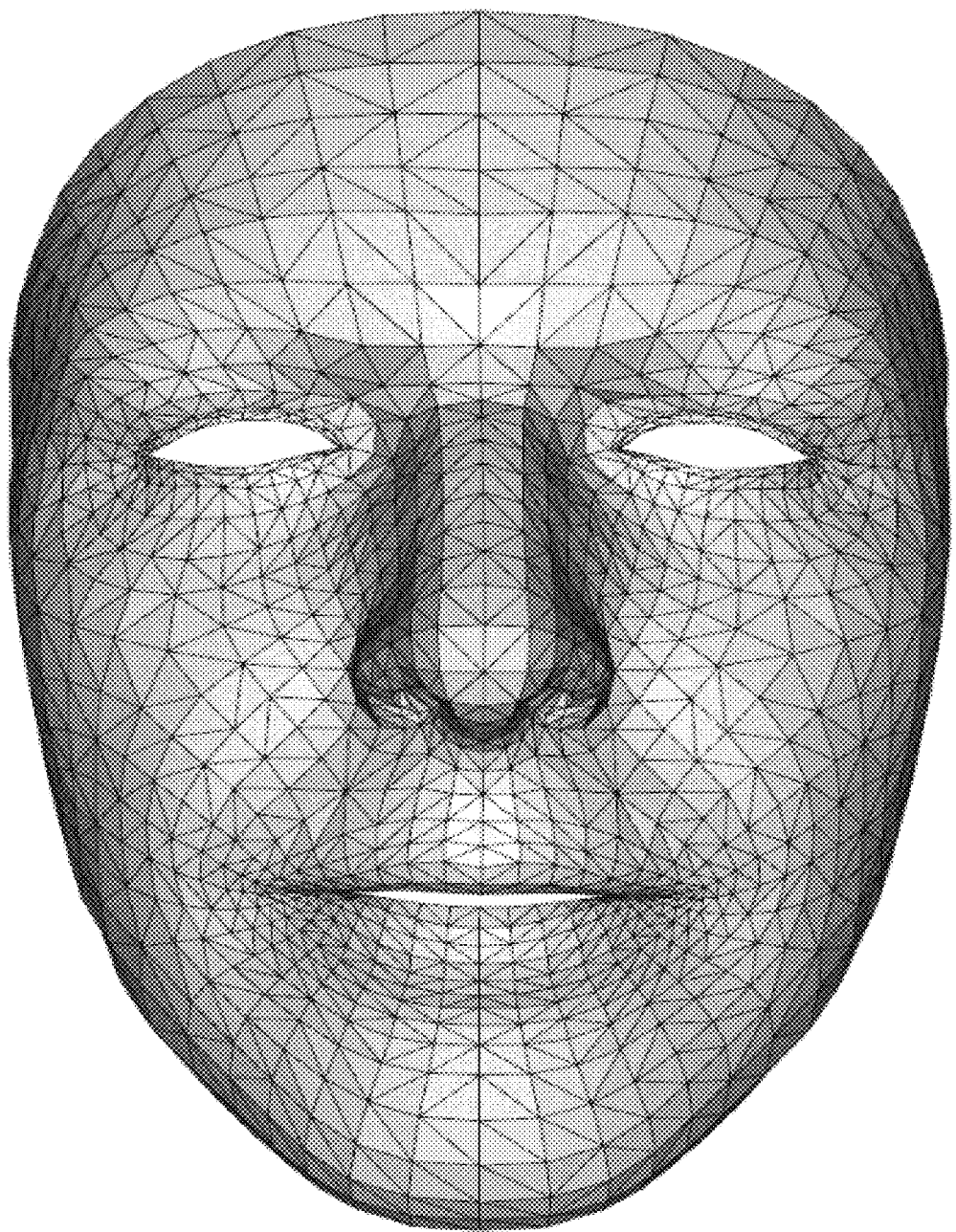
FIG. 2 shows a face template that is warped to fit the available 3D facial scans.

FIG. 2 shows the face template that is warped to fit the available 3D facial scans. It should be appreciated that the warping of the face template to the 3D facial scans may be done directly. However, in the case where the 3D facial scans include not only the entire face, but also the shoulders, and/or are not oriented in the same direction as each other, warping is achieved through solving a series of optimization problems in order to determine how to best warp the face template to each of the scans. Optimization is achieved through a coarse fit based on facial landmarks detectable from a 2D rendering of the 3D scan, followed by a sequence of better fits with more degrees of freedom.

Detection of faces and facial landmarks (the latter may be referred to herein as "face landmarking") may be achieved by leveraging existing libraries, including, for example, the "dlib" library. A series of 2D images can be created by rendering 3D models with chosen view angles. View angles may be chosen using either a user interface or a set of candidate angles. For all of the synthetic images generated, the "dlib" face detection algorithm was applied. If a face was detected, then that face was run through a landmark detection algorithm to identify a set of up to 63 facial landmarks. An example of this approach is shown in FIG. 2.

Figure 3:
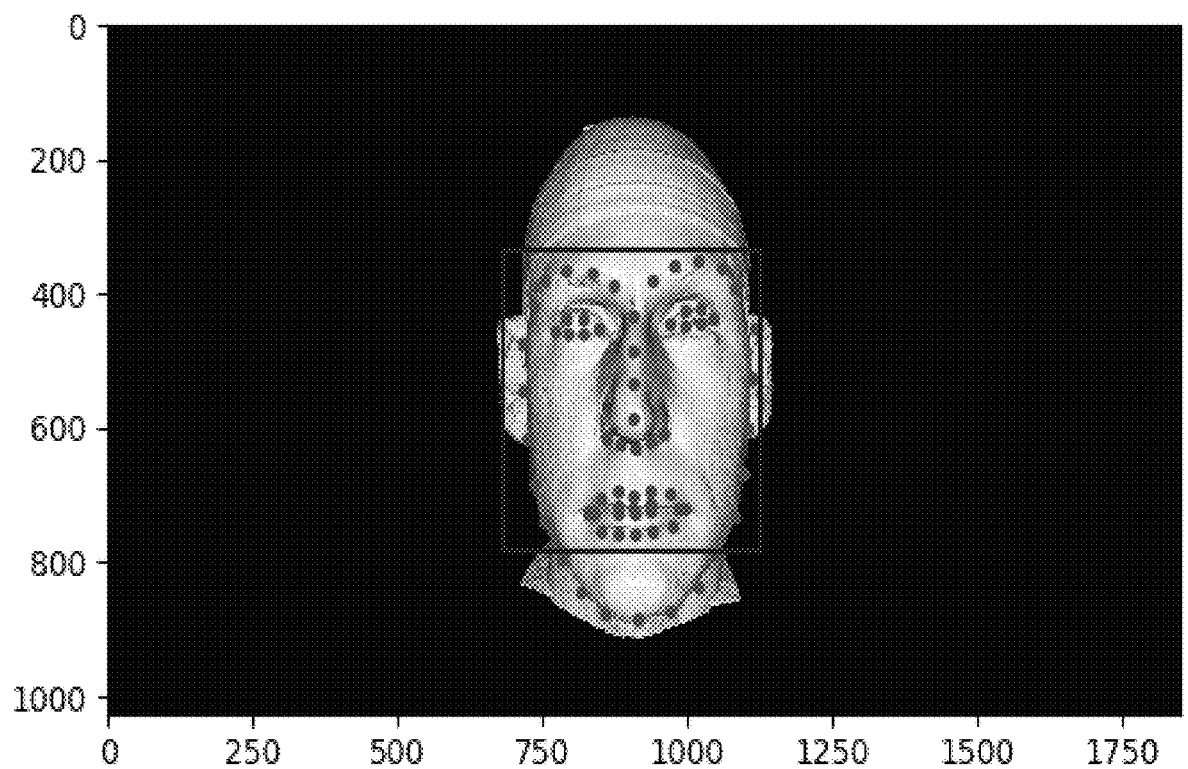
FIG. 3 shows the result of face detection and face landmarking, in which 2D landmarks based on pixel coordinates are detected.

FIG. 3 shows the result of face detection and face landmarking, in which 2D landmarks based on pixel coordinates are detected. The blue box indicates the location of the face and the red dots indicate the locations of the 2D landmarks.

Once face landmarks are identified on a 2D scan, these landmarks can then be mapped to locations on the respective 3D scan. To do this, one can exploit the fact that the camera position, orientation, and camera settings (including, for example, focal lengths) are known. Furthermore, for the scans where landmarks can be identified, the depth associated with each pixel can also be extracted.

Using the aforementioned information, such as, for example, camera position, camera orientation, camera focal lengths, and the depth associated with each pixel, mapping can be generated from the universal coordinate system described above herein (which may be referred to herein as "world coordinates") to the coordinate system in which facial landmarks have been identified (which may be referred to herein as "pixel coordinates"). To do this, let $X_w$, $Y_w$, $Z_w$ be the coordinate system in world coordinates. One must first map from world coordinates to the coordinate system from the point of view of the camera (which may be referred to herein as "camera coordinates"), $X_c$, $Y_c$, $Z_c$. Using the location and pointing of the camera, the mapping from world coordinates to camera coordinates can be written as an affine transform:

$$\begin{bmatrix} X_c \\ Y_c \\ Z_c \end{bmatrix} = \begin{pmatrix} r_{xx} & \cdots & r_{xz} \\ \vdots & \ddots & \vdots \\ r_{zx} & \cdots & r_{zz} \end{pmatrix} \left( \begin{bmatrix} X_w \\ Y_w \\ Z_w \end{bmatrix} - \begin{bmatrix} \Delta X_c \\ \Delta Y_c \\ \Delta Z_c \end{bmatrix} \right),$$

where $\Delta X_c$, $\Delta Y_c$, $\Delta Z_c$ is the location of the camera in world coordinates and $r_{mn}$ is a rotation matrix that aligns the unit vectors of the world coordinates with those of the camera coordinates.

The next transformation is from camera coordinates to pixel coordinates, a transformation which is non-linear but simple in form:

$$\begin{bmatrix} x_p \\ y_p \\ z_p \end{bmatrix} = \begin{pmatrix} f_x/Z_c & & \\ & f_y/Z_c & \\ & & 1 \end{pmatrix} \begin{bmatrix} X_c \\ Y_c \\ Z_c \end{bmatrix},$$

where $f_x$, $f_y$ are the focal lengths in the x and y directions of the camera and $x_p$, $y_p$ are the location in pixel coordinates. The variable $z_p$ is the depth associated with each pixel.

Given a facial landmark in pixel coordinates, one can also invert the sequence of transformations and find that landmark's location in world coordinates. It should be appreciated that $x_p$, $y_p$, $z_p$ can be obtained by identifying the pixel associated with a 2D landmark and looking up $z_p$ from the depth image. The corresponding location in camera coordinates is then:

$$X_c = \frac{x_p z_p}{f_x}, Y_c = \frac{y_p z_p}{f_y}, Z_c = z_p.$$

The mapping can then be inverted from camera coordinates to world coordinates:

$$\begin{bmatrix} X_w \\ Y_w \\ Z_w \end{bmatrix} =$$

$$\begin{pmatrix} r_{xx} & \cdots & r_{xz} \\ \vdots & \ddots & \vdots \\ r_{zx} & \cdots & r_{zz} \end{pmatrix}^{-1} \begin{bmatrix} X_c \\ Y_c \\ Z_c \end{bmatrix} + \begin{bmatrix} \Delta X_c \\ \Delta Y_c \\ \Delta Z_c \end{bmatrix} = \begin{pmatrix} r_{xx} & \cdots & r_{xz} \\ \vdots & \ddots & \vdots \\ r_{zx} & \cdots & r_{zz} \end{pmatrix}^{-1} \begin{bmatrix} \frac{x_p z_p}{f_x} \\ \frac{y_p z_p}{f_y} \\ z_p \end{bmatrix} + \begin{bmatrix} \Delta X_c \\ \Delta Y_c \\ \Delta Z_c \end{bmatrix},$$

which can be simplified to a transformation from pixel coordinates to world coordinates as shown on the right. As a result, given information about the camera and its position, 2D landmarks can be mapped to the corresponding location on the 3D scan.

As mentioned previously, the output of the above process is the location of a set of 2D facial landmarks on a 3D scan. An identical procedure was performed using the face template, shown in FIG. 2, as the 3D scan, thereby producing "template landmarks." These template landmarks will be used to generate an initial transformation for registration. To obtain an initial registration, the following minimization problem can be solved, where $\vec{x}_S^{(i)}$ is a vector containing the location of the i-th identified landmarks in the 3D scan, and $\vec{x}_T^{(i)}$ is a vector containing an equivalent landmark location from the template:

$$\min_{A,b} \sum_{i=1}^{N_{landmarks}} \left\| x_S^{(i)} - A x_T^{(i)} - b \right\|^2 w_i$$

where $w_i=0$ if $\|x_S^{(i)} - Ax_T^{(i)} - b\|$ is above the median error for all landmarks and equal to 1 otherwise. It should be appreciated that, in effect, the error is computed for each facial landmark, the landmarks with the largest error(s) are discarded, and then a least squares problem is solved to obtain A and b. This process is repeated until convergence. Dropping the largest half of the landmarks is an ad hoc approach to account for outliers in the process and can be used since it is serviceable in practice. Alternatively, such an approach may be replaced with a more robust procedure such as, for example, RANSAC.

Ultimately, the outcome is an affine transform that maps the face template shown in FIG. 2 onto the 3D facial scans. In practice, this mapping is relatively imprecise, producing visible errors. However, it provides a useful starting point for more refined registration processes.

It should be appreciated that further registration processes serve to improve the alignment of the mapping to the 3D facial scans. Rather than rely upon a small set of 2D landmarks, these further processes rely on direct comparisons between the vertices of the face template shown in FIG. 2 to the 3D scans.

Specifically, let $\vec{x} \in \mathbb{R}^3$ be the location of i-th vertex on the face template shown in FIG. 2 and $\vec{X}_i \in \mathbb{R}^3$ be the location of the i-th vertex on a given 3D scan. The affine transformation is then found such that:

$$\min_{A,b} \sum_{i=1}^{N} \min_{j} \left\| \vec{X}_j - A\vec{x}_i - b \right\|^2,$$

which is an optimization problem that is related to the Iterative Closest Point (ICP) method, but an affine transformation is allowed rather than just rotation and scaling. This optimization problem is non-convex due to the "min" in the objective function, and it is solved using the Broyden-Fletcher-Goldfarb-Shanno (BFGS) algorithm. To reduce the computation time, an analytic gradient is supplied, and the affine transform generated from the landmark alignment is used as an initial guess for the algorithm.

One of skill in the art will appreciate that the fit between the face template and the 3D scans that results from solving the above optimization problem is better than the fit using facial landmarks alone. However, it should further be appreciated that the fitting step using facial landmarks, described above herein, contributes to obtaining useful results, since it is a good initial guess.

The above-mentioned processes allow rotation, scaling, and translation of the face template shown in FIG. 2 to best fit the faces represented in the 3D facial scans. However, a skilled artisan will appreciate that these processes are unable to reproduce all of the different conformations of a human face. In order to capture a more representative image, a non-rigid transformation can be applied to the face template shown in FIG. 2 to allow more flexibility in fitting.

Such flexibility is achieved by allowing each vertex in the face template to deform separately. Specifically, each vertex is allowed to deform using its own affine transformation $A_i$, $b_i$ where i indicates the template vertex. In order to maintain the overall structure of the template, the use of different affine transformations for connected vertices is penalized. The result is the following optimization problem:

$$\min_{A_0,b_0,A_1,b_1,\ldots} \alpha \sum_{i=1}^{N} \min_{j} \left\| \vec{X}_j - A_i \vec{x}_i - b_i \right\|^2 +$$

$$(1-\alpha) \sum_{i,j \in \text{Connected} \atop \text{Vertices}} \left\| A_i^2 - A_j^2 \right\|_F^2 + \|b_i - b_j\|_F^2,$$

where α is a user-determined parameter that defines the tradeoff between (1) maintaining a single transformation at all vertices and (2) minimizing the mismatch between the template and 3D scan. This optimization problem may be solved using the Limited Memory Broyden-Fletcher-Goldfarb-Shanno (L-BFGS) algorithm with an analytical gradient.

Based on the above, coarse details of faces are captured. While the aforementioned models are not capable of capturing all the details of the 3D scans, they are accurate enough to serve as a standard coordinate system for placing and/or designing face masks, as described further below.

As mentioned previously herein, after generating a uniform coordinate system for referencing equivalent facial points on different facial scans, the second step is to develop a process of designing oxygen masks for a given 3D scan. The approach described below is not intended to be taken in a limiting sense; that is, it should be appreciated that alternative and/or additional steps, including, for example, a manual determination and/or assessment of how well a given mask fits a given user (e.g. by questioning the user after trying on a mask), may be necessary or desirable to generate a final mask design.

Figure 4:
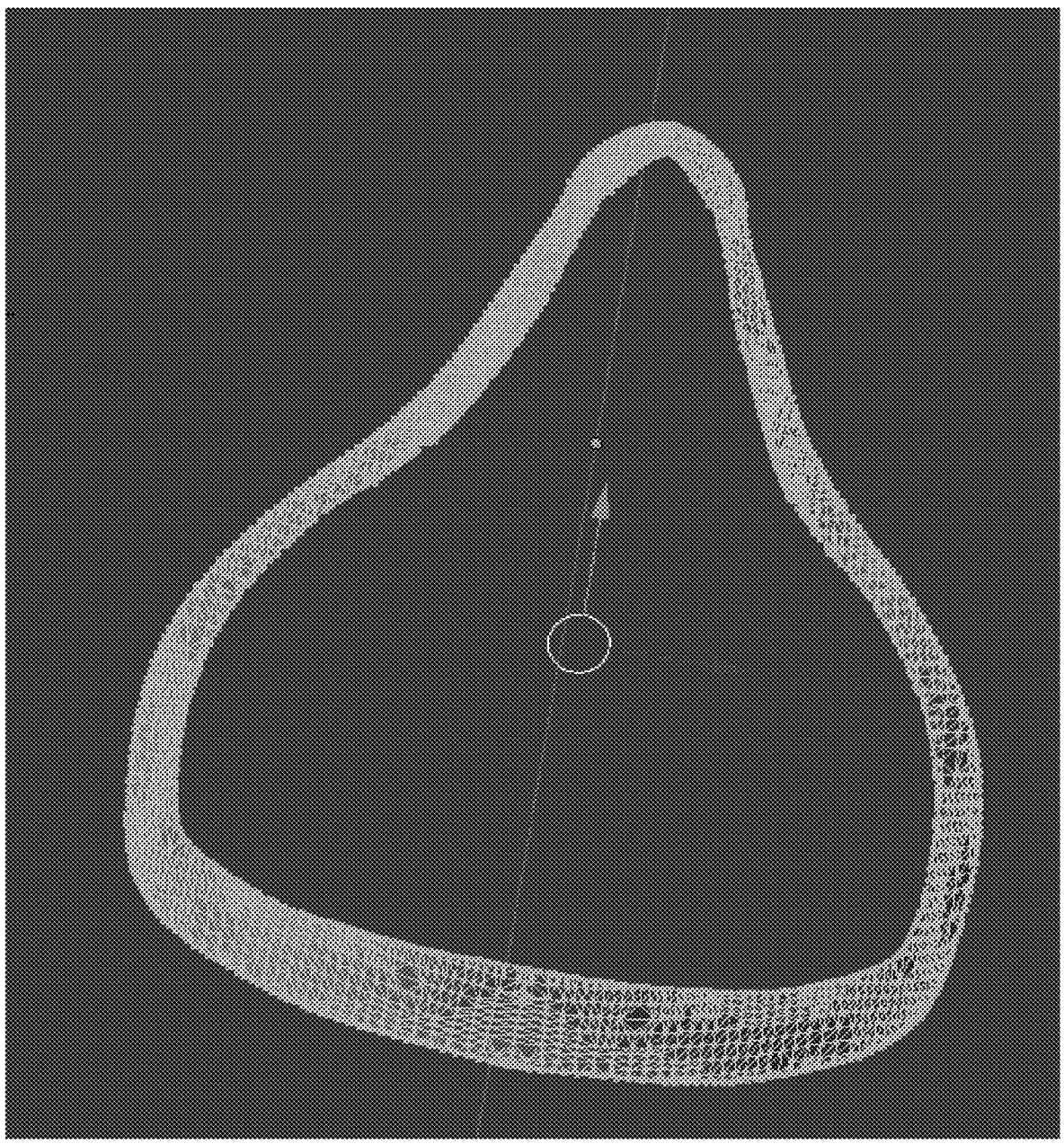
FIG. 4 shows a template used to model the mask cushion interface.

The focus is to design a custom mask cushion interface between a user's face, as represented by a 3D scan, and a mask. As stated above herein, the mask may be a generic, commercially available, and/or off-the-shelf mask, which can then be adapted with the mask cushion interface to be fitted to the specific user. To generate such an interface, a template is used that defines the basic shape of the interface, as shown in FIG. 4.

The mask interface template is manually positioned on the face template shown in FIG. 2. For each vertex in the mask interface template, the closest vertex on the face template is found.

To perform an initial alignment, it may be assumed that the correspondence between each vertex on the mask cushion interface and the nearest vertex on the face template remain fixed. A least-squares problem may then be solved to identify an affine transformation that minimizes the distance between each vertex on the face template and its corresponding vertex on the template after it has been warped to match the 3D scans. The output of this process is a shift, b, and rotation/scaling, A.

It should be appreciated that the initial correspondences were based on a template that was not deformed, and therefore may not be accurate due to the non-rigid transformations applied to the face template. Once the initial alignment has been performed as described above to produce a combined face template (i.e., the mask cushion interface combined with the face template of FIG. 2), and once the combined face template has an initial orientation, a second optimization problem may be solved to minimize the distance between each vertex of this combined face template, $x_i$, and the closest vertex on the 3D scan, $\vec{X}_i$, which can be written as:

$$\min_{A,b} \sum_{i=1}^{N} \min_{j} \left\| \vec{X}_j - A\vec{x}_i - b \right\|^2,$$

One of skill in the art will appreciate that this is the same optimization problem that is required to be solved in order to align the face template with the 3D scans, and, as a result, this problem may be solved using the same variant of the ICP method described above herein.

Next, the combined face template may be allowed to deform in order to better conform to the 3D scan data. To accomplish this, the same non-rigid registration problem used to fit the face template may be solved:

$$\min_{A_0,b_0,A_1,b_1,\ldots} \alpha \sum_{i=1}^{N} \min_{j} \left\| \vec{X}_j - A_i\vec{x}_i - b_i \right\|^2 +$$
$$(1-\alpha) \sum_{i,j \in \text{Connected} \atop \text{Vertices}} \gamma \left\| A_i^2 - A_j^2 \right\|_F^2 + \left\| b_i - b_j \right\|_F^2,$$

where the various A and b are the affine transforms associated with different vertices on the combined face template. It should be appreciated that the optimization process has a trade-off between more tightly conforming to the face (the left term) and avoiding sudden deformations in the mask (the right term). The parameter $\gamma$ penalizes the deformations of the mask that involve rotations and scalings relative to those that only involve translations/shifts. This optimization process may be solved using the L-BFGS algorithm, though the size of the optimization problem is significantly larger because the combined face template has significantly more vertices then the face template shown in FIG. 2.

The final output is a mask that has been deformed to fit the 3D scan data. Due to the trade-off in the optimization problem described above herein, there are deviations between the warped combined face template and the 3D scans. If the amount of deviation is too large, it can be reduced by increasing the value of $\alpha$ in the previously-described non-rigid registration problem.

As described previously herein, after developing a process of designing oxygen masks for a given 3D scan, the third step is to develop a process for automatically fitting an oxygen mask on to a given 3D scan and quantifying the amount of mismatch between the mask and the face represented in the scan.

Once a mask has been designed, using, for example, the process described above herein, the next task is to assess how well or poorly the designed mask performs when fitted to a different face. To address this task, a procedure may be followed similar to the mask design process, but restricting the deformations allowed to simple rigid body transformations (i.e., rotations and translations). Initially, a rough alignment must be obtained for the non-warped mask. Then, an ICP algorithm may be applied for further alignment and adjustments.

Since the various 3D scans are oriented differently, one must first orient the mask on the new face before a detailed comparison can be performed. This may be accomplished by assuming the correspondence points associated with the combined face template remains valid (i.e., assuming that the correspondence points described above herein between each vertex on the mask cushion interface and the nearest vertex on the face template remain valid). Then, the following optimization problem is solved:

$$\min_{R,b} \sum_{i=1}^{N} \min_{j} \left\| \vec{X}_j - R\vec{x}_i - b \right\|^2,$$

where R is a rotation matrix and b the shift. Since this is simply a rigid body registration problem, standard techniques known in the art can be used to identify the rotation and shift that minimize error.

Once the initial alignment is achieved, the quality of fit is improved by performing ICP between the combined face template and the 3D scan data. Unlike previous processes described herein, the combined face template is not allowed to be scaled or skewed, only rotated and translated. Metrics for fit quality can include, for example, the root-mean-squared error.

As described previously herein, after developing a process for automatically fitting an oxygen mask on to a given 3D scan and quantifying the amount of mismatch between the mask and the face represented in the scan, the fourth and final step is to cluster the 3D facial scans to minimize the amount of mismatch given a fixed number of masks, and to use that information to generate a set of exemplar facial scans. In other words, the 3D facial scans are clustered based upon how well, or how poorly, the combined face template designed above herein fits when applied to other faces. One of skill in the art will appreciate that the goal is to find faces that are similar enough such that all of these faces can use a mask of the same design and construction without dramatically impacting overall fit.

To perform the aforementioned clustering, a hierarchical clustering approach may be used. At each step of the process, the face (or set of faces) may be identified that could be represented by a mask designed for a different face, with the smallest growth in maximum error (i.e., minimization of the predicted worst fit). This process may be repeated until only a single face remains.

Figure 5:
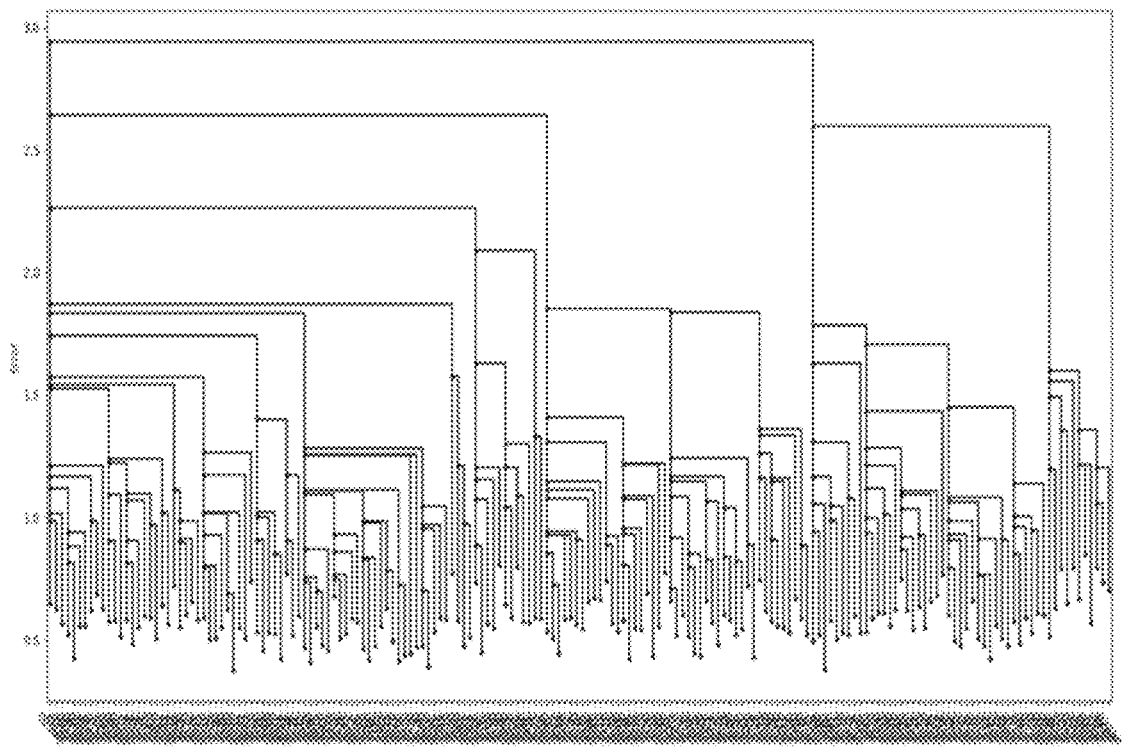
FIG. 5 is a dendrogram showing 180 3D scans in a database on the x-axis and the error associated with using a mask designed for a single face on other members in a cluster of scans on the y-axis.

In an exemplary set of 180 3D facial scans the results of this process are illustrated in a dendrogram (FIG. 5), with the 3D scans on the x-axis and the error associated with using a mask designed for a single face on other members in the cluster on the y-axis. The bottom-most set of dots shows the error associated with masks designed for that specific face, which generally takes on values around 0.5 for this data set and with these settings. The incorporation of a face scan within a larger cluster is indicated by the merging lines in the figure, and the blue dots indicate the worst-case error associated with the entire cluster. A horizontal line represents a cluster of scans including all the scans branching off below it, with the maximum error for that cluster when using the mask designed for the member of the cluster that minimizes the maximum error indicated by the horizontal line's value on the y-axis. The blue dot on each horizontal line indicates the scan (on the x-axis) resulting in that minimized maximum error when using its corresponding mask for all scans in the cluster. As one moves up the y-axis, each time a new horizontal line is encountered on the graph, one cluster/mask has been removed. Thus, there are 179 horizontal lines, culminating at the top of the dendrogram which represents the scan with the lowest maximum error if the associated mask is used for all scans in the dataset, with a worse cast error of just under 3.0.

Figure 6:
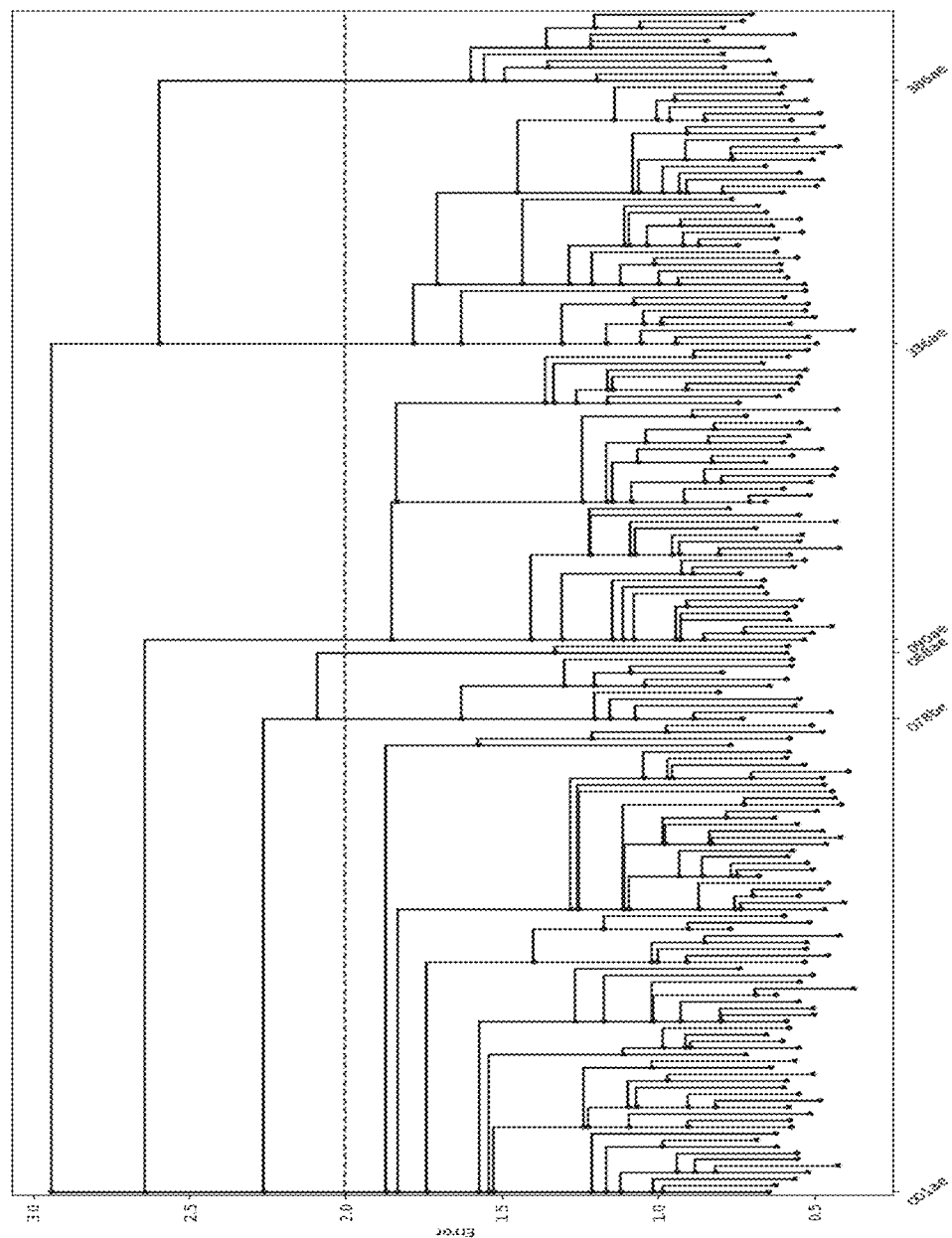
FIG. 6 shows the dendogram of FIG. 5, with an extra line to indicate a chosen maximum error and non-central x-axis values removed.

It should be appreciated that the clustering data can be used to aid in the design of future masks. Purely as a non-limiting example, if a maximum root-mean-squared error of 1.5 is considered tolerable, then one can look through the set of facial scans to design masks for the scans that have not yet been incorporated into a cluster with an error value of 1.5. For the same exemplary set of 180 3D facial scans described above, this would result in 21 masks needing to be designed. It should be appreciated that larger error/threshold values would result in fewer masks needing to be designed. For example, a root-mean-squared error value of 2.0 results in only 6 required masks. This can be clearly seen in the dendrogram (FIG. 6). The red dashed line indicates the chosen maximum error value of 2.0. There are six blue vertical lines extending downwards from that red line, indicating the six clusters necessary to achieve a root-mean-squared error value of 2.0 or less. The highest blue dot vertically on each vertical line represents the central scan for each cluster, the mask for which would be used to achieve the maximum error shown for each of the clusters (the y-value at the location of that highest blue dot). The scans (x-values) corresponding to each of these six blue dots are shown on the x-axis in FIG. 6, with the other scan numbers removed for clarity.

This exercise clusters faces to minimize worst case fit in a hierarchical fashion. However, root-mean-squared error may be improved upon in some embodiments as a proxy for the quality of a mask kit. For user comfort and/or mask effectiveness, a tighter fit may be more important on certain parts of the face than on others. When known, errors in these parts of the face may be weighted more heavily in the error measure, thereby improving the resulting overall fit when using such a method.

Once a custom mask cushion interface is designed using, for example, the procedures mentioned herein, the interface can then be manufactured. One of skill in the art will appreciate that the manufacture of a custom mask cushion interface is easier, simpler, and more cost-effective than manufacturing a complete, fitted mask due to manufacturing cost limitations involving production of a full fitted mask. Such a custom mask cushion interface is therefore an improvement over the current state of the art.

The custom mask cushion interface may be manufactured using any technique capable of manufacturing an item made of soft, conformable material, including, but not limited to, 3D printing, injection molding, and the like. The cushion interface itself may be made of any soft, conformable material, including, but not limited to, foam, molded plastic, and the like.

It should be appreciated that the custom mask cushion interface may be applied to any available, generic mask, such as, for instance, CPAP masks, pilot oxygen masks, and other face masks that cover the nose and/or mouth. Therefore, the custom mask cushion interface is capable of being utilized in a variety of industries and applications. It should further be appreciated that one or more embodiments of the present invention therefore enable the leveraging of widely-available consumer devices, i.e., mobile computing devices, including, for instance, smartphones, to create custom-fitted mask at low cost, which has been a goal of various industries for some time.

One or more embodiments of the present invention additionally enable the production of custom masks that fit well for a particular individual, increasing their comfort while wearing the mask. The current state of the art uses injection molding to produce generically-sized masks, resulting in low-cost, but poor-fitting, masks. Therefore, masks that need to be worn over a long period of time, such as, for example, at night in the case of CPAP mask users, can cause severe discomfort for the wearer. A custom-fitted mask using the 3D point cloud model creation and custom mask cushion interface generation techniques described herein result in the adaptation of generic masks for a particular user's unique facial geometry, thus increasing comfort while maintaining the low-cost benefit of generically-sized masks.

Figure 7:
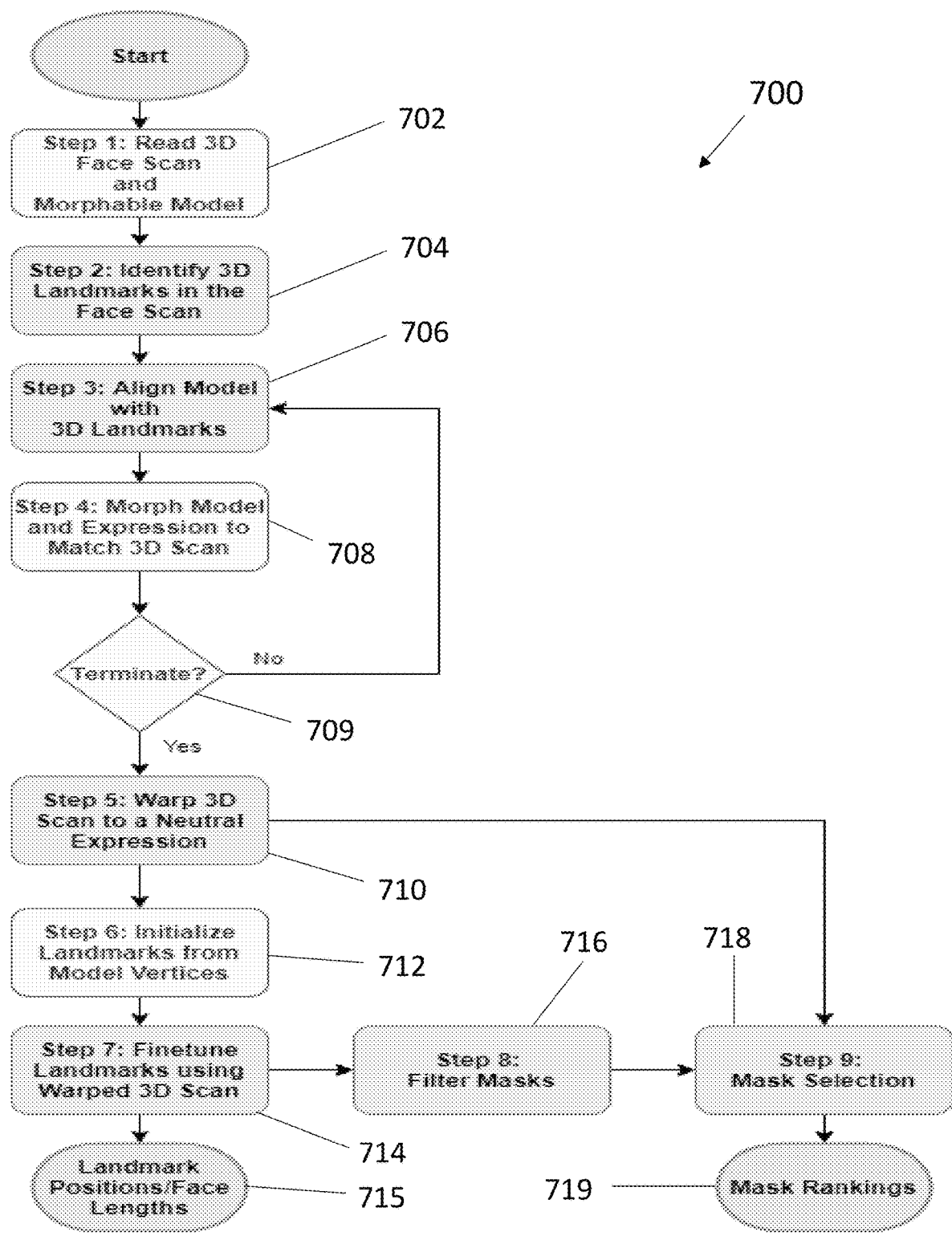
FIG. 7 is a flow diagram illustrating the process for the automated design of an anatomically conforming apparatus, including, for instance, a mask, according to an embodiment of the present invention.

As stated above herein, the design and/or selection of anatomically conforming, mass-producible wearable apparatuses, including, for example, face masks, oral-nasal masks, CPAP masks, and other face-conforming masks, may be automated. Turning now to FIG. 7, a flow diagram is presented illustrating a method 700 for automatically designing and/or selecting an anatomically conforming apparatus, with special reference to an embodiment in which such an apparatus is a face-conforming mask (e.g., oxygen mask, CPAP mask, etc.).

Generally, the method 700 reads in a 3D scan of a user's face and returns: (1) the location of pre-determined facial measurements, such as, for instance, length of the nose, and (2) a ranking of mask designs from best- to worst-fitting for that user. The method 700 may be executed on any suitable system, including, for example, a computing system for running a plurality of computer executable programs to execute the method, where the programs may be contained on a variety of signal-bearing media. Illustrative signal-bearing media include, but are not limited to: (1) information permanently stored on non-writable storage media (e.g., read-only memory devices within a computer such as CD-ROM disks readable by a CD-ROM drive); (2) alterable information stored on writable storage media (e.g., floppy disks within a diskette drive or hard-disk drive, solid state storage devices); and (3) information stored on non-transitory computer readable medium and conveyed to a computer by a communications medium, such as through a computer or telephone network, including wireless communications.

At step 702, a 3D face scan of a user is taken and assembles a morphable face model, both of which can be stored in, for example, computer or system memory. A typical morphable model includes: (1) a mean face which is a 3D model of the average face obtained from a data set (such as, for instance, any of the data sets described above herein); (2) a set of shape modes that capture the deformations of the face observed in the data; and (3) a set of expression modes that captures the deformations in a face due to different emotions.

It will be appreciated that any given morphable model may contain other components if necessary to design a face mask for a particular purpose. It will further be appreciated that morphable models, their creation from data, and the different features such models contain will be familiar to those of skill in the art. See, e.g., A. Patel and W. Smith, "3D morphable face models revisited," 2009 IEEE Conference on Computer Vision and Pattern Recognition (2009). Loading 3D face scans is also well-known to a skilled artisan, provided, however, that the scan is in a common format, such as, e.g., a Stereolithography (STL) or Polygon (PLY) format, for which open-source readers are readily available.

At the outset of the method 700, a morphable model trained on a standard population is used. However, as 3D scans are processed, the model is refined to best fit the user or users for which the mask is being designed.

At step 704, 3D landmarks in the user's 3D face scan is automatically identified so that a rough alignment of the 3D scan and the morphable model can be performed in step 706. The step 704 further includes identifying the position (x,y) (i.e., row and column) of the pixel associated with each 3D facial landmark.

It is well-known in the art to perform the aforementioned step in 2D by running a facial landmark detector (e.g., https://github.com/davisking/dlib-models) on a 2D image of the subject (e.g., https://pypi.org/project/eos-py/). However, unlike those 2D-based approaches, the method 700 returns the 3D location of landmarks by, in a non-limiting example, (1) rendering, for a given 3D face scan, the model as a 2D image and additionally recording camera parameters (i.e., the transformation from 3D space to 2D image pixels); (2) supplying the 2D image to a 2D facial landmark detector to record pixel locations of the facial landmarks; (3) given the camera parameters and the 2D locations of the landmarks, projecting those landmarks on to the 3D face scan by finding the ray that intersects the camera, the 2D pixel location of each landmark, and the closest point on the 3D face for each landmark; and (4) saving that closest point. If a location on the 3D face scan is not found (i.e., the ray through a given 2D pixel location does not intersect the 3D face scan), the entire ray is saved.

Step 706 then then applies a scaled orthographic transform to the morphable model to best match the landmarks on that model with the identified and saved points and/or rays from step 704. It should be appreciated that the current state of the art is to identify the location of facial landmarks on a morphable model by hand. To perform the matching and alignment, the distance between the landmark locations on the morphable model and the landmark locations on the 3D scan (or the ray that intersects the 2D location of the landmark) is minimized. Although fitting a scaled orthographic transform to 2D data is known to a skilled artisan (see, for example, the eos-py code repository), step 706 performs the alignment in 3D and can also perform the alignment with rays as well as points.

A specific, non-limiting example of the aforementioned fitting/alignment procedure follows, with four sub-steps. First, given the current location of the landmarks on the 3D model, the closest point on the corresponding landmark ray is found. Second, an affine transform is found that, when applied to the 3D model, minimizes the distance between the landmarks on the 3D model and the landmarks on the face scan or the closest point on the ray. It should be appreciated that finding an affine transform in such a context involves solving a least squares problem, which is well-known to a skilled artisan. Third, a scaled orthographic transform is found that is closest to the affine transform previously identified. To accomplish this, let the affine transform have the form x'=Ax+b, where x is the original location of a point and x' is the location after the transform is applied. Decompose A using the singular value decomposition (SVD) so $A=U\Sigma V^T$. Let $$s = \frac{1}{3}\sum_{i=1}^{3}\sum_{ii}.$$

Then, the scaled orthographic transform has the form: $x'=sUV^Tx+b$. Fourth, if the change in the orthographic transform between iterations is below a pre-determined threshold, then the procedure is stopped. Otherwise, the procedure is repeated from the first sub-step.

Next, in step 708, the morphable model face is deformed to best fit the 3D face scan. This can be achieved through one or more algorithms known to a skilled artisan. A non-limiting example of a process for deforming the morphable model face is as follows: First, for each vertex in the morphable face model, the closest corresponding point on the 3D face scan is found. Second, let the location of each vertex in the morphable model be defined as follows: $v_i = \overline{v}_i + \sum_{k=1}^{N} a_k u_{ik} + \sum_{j=1}^{N} b_j w_{ij}$ where $\overline{v}_i$ is the location of the i-th vertex in the mean face, $u_{ik}$ is the deformation of the i-th vertex by the k-th shape mode, and $w_{ij}$ is the deformation applied by the j-th expression mode. The coefficients $a_k$ and $b_j$ are the coefficient associated with each mode. Finding the coefficients that minimize the distance requires solving a least squares problem, a problem that is well-known in the art. Third, the first sub-step is repeated until either convergence (i.e., the change in coefficients falls below a threshold) or a pre-determined number of iterations occurs.

The output of step 708 is a "warped" 3D face model with a new set of coefficients. At decision point 709, if the converged coefficients are within a pre-determined threshold, then the method 700 proceeds to step 710. Otherwise, the method reverts to step 706 using the warped face model identified in step 708.

Next, step 710 maps the user's face back to a neutral expression to remove the impact that the expression can have on measured landmark distances. To do so, the location of each point on the 3D face scan must be expressed in the coordinates of the 3D model. In at least one embodiment, this can be accomplished by expressing the position of each vertex in the 3D face scan in the coordinate system defined by the 3D scan. The following procedure is a non-limiting example of how this can be done: First, for each vertex on the 3D scan, the nearest vertex on the morphable face model is computed. If this distance is larger than a user-determined threshold (e.g., greater than 2 cm), then the vertex is removed from the 3D scan. It should be appreciated that these points do not correspond to relevant points on the face, such as, for instance, the back of the head, hair, or clothing. Second, for each triangle (i.e., the two-dimensional object formed by three connected vertices in the mesh) in the 3D face model, the normal direction is computed. Then, the distance is found between any point on the triangle to each vertex on the 3D scan along the normal direction. The intersection point with the triangle is stored using a Barycentric coordinate system, which is a coordinate system well-known in the art that describes the location of a point on a triangle with respect to the three vertices in the triangle. The distance from the triangle along the normal direction is also saved. Vertices that are not contained within the face are considered to have infinite distance. Third, each vertex in the 3D face scan is associated with the triangle to which it is closest. Each point in the 3D scan is then expressed in terms of the Barycentric coordinates of the corresponding triangle and the deviation in the normal direction, as opposed to the original Euclidean (x, y, z) coordinates. Fourth, the 3D morphable model is warped to be a neutral expression by setting $b_j=0$ for all j. Fifth, the Euclidean coordinates of each vertex in the 3D face scan are then reconstructed from the saved Barycentric coordinates and deviation in the normal direction. As a result of the warped 3D model, the location of the triangle vertices and the normal direction will change, so the resulting Euclidean coordinates will differ. The final result of the above-mentioned procedure is a warped version of the original 3D face scan with the expression removed/made neutral.

Then, step 712 identifies the initial location of the landmarks used for face measurements and mask fitting based on the position of the 3D morphable model. Identifying landmark points on a morphable model is a common task in the art and can be achieved by, e.g., manually selecting vertices (or a point between vertices) on the morphable model. Given the vertex number of each landmark on the morphable model, the location of that vertex is found after the previous steps in the method 700 have been performed to extract the landmark location.

Next, step 714 uses the facial landmarks as initial points to extract face measurements. Although it is known in the art to use landmarks to compute measurements, errors in model warping processes will be carried over to these measurements. To prevent such error propagation, step 714 performs an analysis on the warped 3D scan to correct some, or all, of any errors introduced in previous steps. In at least one embodiment, this step includes, but is not limited to, the following refinement sub-steps: First, to compute the width of the nose, each point on the warped 3D scan associated with a "nose vertex" (i.e., a vertex in the 3D model predetermined to contain the nose) is associated with a corresponding point on the other side of the nose by reflecting over the center of the face. The center of the face is determined by fitting a plane to the line of vertices in the center of the model. The width of the nose is determined by the maximum distance between any two points in this set. Second, to compute the length of the nose, the base of the nose is first found. Rather than using the location in the 3D model, the strip of points that are closest to the centerline in the 3D model is extracted. A quadratic model is fit to this strip of points and the minimum point is chosen as the nose base. The rationale behind this approach is to find the junction between the upper lip and the bottom of the nose. From this point, the length of the nose is measured by finding the vertical distance to the highest point on the nose. Third, to compute the length of the face (e.g., from the chin area to the nose bridge), a strip along the centerline of the face is extracted in both the chin region and the nose bridge region. A quadratic model is fit to this strip of points and the minimum value is used.

One of skill in the art will appreciate that additional sub-steps can be defined and used for other facial measurements and/or landmarks. It should further be appreciated that the method described herein does not rely upon predetermined locations on the face model to measure distances. Rather, these locations are used as initial guesses that are later refined on a full 3D model. The updated landmarks and facial measurements are then carried over to step 716 below, and may also be output to the user at step 715.

The inputs to step 716 are a set of masks and the criteria used to filter poorly fitting masks based on the measured face lengths. Initially, the filter criteria are determined by subject matter experts (SMEs). As the method 700 processes more data, it generates a database that contains the face measurements as well as the mask that was eventually chosen. At this point, the SME-based rules are adjusted or replaced by mask filtering rules learned from data as will be described below. Even small amounts of data (e.g., as small as one data point) can be used to adjust the parameters defined in the SME-provided rules (e.g., a large mask may initially have a face length of 100 mm but may be adjusted up to 105 mm based on data). New rules can be established using algorithms like the CN2 induction algorithm (see, e.g., P. Clark and T. Niblett, "The CN2 induction algorithm," *Machine Learning* 3.4: 261-83 (1989)), or more modern variants, and compared against the SME-defined rules to judge their efficacy.

Finally, step 718 implements a mask selection process. In this step, a 3D scan of any feasible masks from step 716 are loaded into memory. These models are subdivided into the vertices that should be in contact with the face and the remainder of the model. The iterative closest point (ICP) algorithm, which is known in the art, then used to bring the chosen mask into the best possible alignment with the face. To both limit the size of the problem and avoid non-sensical results (e.g., an oxygen mask being placed on the top of the head simply because that region matched the mask contours well), the face model is used to remove any points in the 3D scan that do not correspond with regions where a mask should rest. It should be appreciated that deciding where a mask should rest can be done by marking the locations on the morphable model the regions where a mask should be on an individual's face. Rankings of the feasible masks are then output to the user at step 719.

It should be appreciated that the ICP algorithm has an objective function, which is different than what is commonly known and/or utilized in the art. That is, uniform weighting of all points equally is common in using the ICP algorithm. However, in the method described above, and in particular step 718, each part of the face is weighted differently. These weights are initially chosen by an SME, but later refined such that the residual produced by the ICP algorithm is the smallest, or is as small as possible, for the mask that is actually selected. It should therefore be appreciated that such a weighing process can identify subtle but important issues that are relevant for mask fit, such as, for instance, air leaking out into the eyes. These issues can then be fixed by, e.g., weighting the fit more heavily in the region between the nose and the eyes than elsewhere on the face.

Embodiments of the present invention have been described with particular reference to face masks, including, for example, oral-nasal masks, but it should be appreciated that the invention in its embodiments is applicable to other anatomically conforming wearable apparatuses that may be worn, for instance, on areas of the body other than the face. Such apparatuses may include, for example, shoes, gloves, earplugs, chair seats, and the like.

These and other objectives and features of the invention are apparent in the disclosure, which includes the above and ongoing written specification.

Any of the processes, methods, and algorithms described in any of the preceding sections may be embodied in, and fully or partially automated by, code instructions executed by one or more computer systems or computer processors comprising computer hardware. The processes and algorithms may be implemented partially or wholly in application-specific circuitry.

Further, any process descriptions, elements, or units in the diagrams described herein and/or depicted in the attached figures should be understood as potentially representing units, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

We claim:

1. A method for producing a custom-fitted face mask, the method comprising:
   utilizing a mobile computing device to project a matrix of infrared wavelength laser points on a person's face, wherein each laser point in the matrix has a corresponding initial location on the person's face;
   measuring one or more changes in the initial location of one or more of the infrared wavelength laser points, thereby producing one or more measurement change values;
   generating a 3D point cloud model of the person's face using the one or more measurement change values; and
   using the 3D point cloud model to manufacture a custom mask cushion that is capable of integrating with a generically-sized face mask, thereby producing a custom-fitted face mask for the person's face,
   wherein the using the 3D point cloud model to manufacture a custom mask cushion comprises:
      generating a uniform coordinate system for referencing equivalent points on a plurality of 3D face scans, each of the plurality of 3D face scans representing a different face;
      fitting the generically-sized face mask on to a 3D face scan in the plurality of 3D face scans and quantifying an amount of mismatch between the generically-sized face mask and the 3D face scan;
      clustering the plurality of 3D face scans to minimize an amount of overall mismatch that would result from using a fixed number of standard-sized face masks to cover all of the plurality of 3D face scans; and
      generating a set of exemplar face scans based on the clustering.

2. The method of claim 1, wherein the mobile computing device is a smartphone.

3. The method of claim 1, wherein the matrix of infrared wavelength laser points is generated by a camera on the mobile computing device.

4. The method of claim 1, wherein the measuring step and the generating step are both performed on the mobile computing device.

5. The method of claim 1, wherein the custom mask cushion is manufactured by either 3D printing or injection molding.

6. The method of claim 1, wherein the custom mask cushion is made of a soft, conformable material.

7. The method of claim 1, wherein the generating a uniform coordinate system comprises warping a fixed face template to each 3D face scan in the plurality of 3D face scans.

8. The method of claim 7, wherein the warping is achieved via solving a series of optimization problems in order to determine how best to warp the fixed face template to each 3D face scan in the plurality of 3D face scans.

9. The method of claim 8, wherein solving the series of optimization problems comprises creating a series of 2D images corresponding to each of the plurality of 3D face scans by rendering each 3D face scan with chosen view angles and identifying facial landmarks on each series of 2D images.

10. The method of claim 9, further comprising mapping the identified facial landmarks on each series of 2D images on to each corresponding 3D face scan in the plurality of 3D face scans.

11. The method of claim 10, wherein the mapping the identified facial landmarks comprises using pixel coordinates of a camera on the mobile computing device.

12. The method of claim 7, wherein warping the fixed face template to each 3D face scan in the plurality of 3D face scans further comprises applying a non-rigid transformation to the fixed face template, thereby permitting each vertex in the fixed face template to deform independently using each vertex's own affine transformation.

13. The method of claim 7, further comprising:
   generating a cushion template that defines a basic shape of the custom mask cushion;
   positioning the cushion template on the fixed face template;
   aligning each vertex on the cushion template with a nearest corresponding vertex on the fixed face template, thereby generating a combined face template; and
   permitting the combined face template to deform to better fit the plurality of 3D face scans.

14. The method of claim 1, wherein the clustering comprises utilizing a hierarchical clustering approach that identifies a face or a set of faces for which the generically-sized face mask would fit.

* * * * *